US007166930B2

(12) United States Patent
Young

(10) Patent No.: US 7,166,930 B2
(45) Date of Patent: Jan. 23, 2007

(54) UNINTERRUPTIBLE POWER SUPPLY APPARATUS AND METHODS USING A DISPLAY WITH VARIABLE BACKLIGHTING

(75) Inventor: Brian R. Young, Raleigh, NC (US)

(73) Assignee: Eaton Power Quality Corporation, Cleveland, OH (US)

( * ) Notice: Subject to any disclaimer, the term of this patent is extended or adjusted under 35 U.S.C. 154(b) by 425 days.

(21) Appl. No.: 10/623,929

(22) Filed: Jul. 21, 2003

(65) Prior Publication Data

US 2005/0017582 A1 Jan. 27, 2005

(51) Int. Cl.
*H02J 7/00* (2006.01)

(52) U.S. Cl. ........................... 307/64; 307/66; 700/22; 700/286

(58) Field of Classification Search .................. 307/64, 307/66; 700/22, 286
See application file for complete search history.

(56) References Cited

U.S. PATENT DOCUMENTS

| | | | | |
|---|---|---|---|---|
| 5,493,685 | A | 2/1996 | Zenda | |
| 5,854,617 | A * | 12/1998 | Lee et al. | 345/102 |
| 5,995,400 | A * | 11/1999 | Park et al. | 363/146 |
| 6,385,466 | B1 | 5/2002 | Hirai et al. | |
| 6,717,376 | B1 * | 4/2004 | Lys et al. | 315/292 |
| 6,762,740 | B1 * | 7/2004 | Kimura | 345/102 |
| 2001/0041605 | A1 * | 11/2001 | Suzuki | 455/574 |
| 2002/0033692 | A1 * | 3/2002 | Sakai et al. | 320/134 |
| 2003/0132949 | A1 * | 7/2003 | Fallon et al. | 345/700 |
| 2004/0013441 | A1 * | 1/2004 | Yoshimura et al. | 399/81 |
| 2004/0171410 | A1 * | 9/2004 | Deeds | 455/575.1 |
| 2004/0190075 | A1 * | 9/2004 | Shibata | 358/400 |
| 2004/0207404 | A1 * | 10/2004 | Zhang et al. | 324/426 |

FOREIGN PATENT DOCUMENTS

| | | | |
|---|---|---|---|
| EP | 0 707 301 | A1 | 4/1996 |
| EP | 0 911 799 | A2 | 4/1999 |
| JP | 08082841 | | 3/1996 |
| JP | 2002328048 | A * | 11/2002 |
| WO | WO 03/042801 | A1 | 5/2003 |

OTHER PUBLICATIONS

Notification of Transmittal of the International Search Report and the Written Opinion of the International Searching Authority, or the Declaration, PCT/US2004/022668, Dec. 1, 2004.

* cited by examiner

*Primary Examiner*—Brian Sircus
*Assistant Examiner*—Daniel Cavallari
(74) *Attorney, Agent, or Firm*—Myers Bigel Sibley & Sajovec

(57) ABSTRACT

A UPS includes a UPS circuit that selectively supplies power to a load from first and second power sources, and a display (e.g., an LCD) coupled to the UPS circuit and operative to provide display graphical and/or textual information pertaining thereto. The UPS apparatus further comprises a backlight circuit coupled to the UPS circuit and operative to provide different backlightings of the display responsive to respective states of the UPS circuit.

3 Claims, 2 Drawing Sheets

UNINTERRUPTIBLE POWER SUPPLY APPARATUS AND METHODS USING A DISPLAY WITH VARIABLE BACKLIGHTING

BACKGROUND OF THE INVENTION

The present invention relates to monitoring of electronic devices, and more particularly, to apparatus and methods for controlling a display of an uninterruptible power supply (UPS).

Visual interfaces are used in a variety of electronics applications to provide such functions as status monitoring, device configuration and/or aesthetic effects. For example, touchscreen displays and panel switches may use color coding, distinctive lighting and/or textual display to provide warnings and/or alarms to users. Liquid crystal displays (LCDs) with user-selectable color schemes have also been used to improve readability and to provide visual entertainment.

UPSs often include some type of integrated visual display, such as "front-panel" light-emitting diode (LED) indicators and/or a relatively small and inexpensive front-panel LCD, which can provide an operator with status information pertaining to the operation of the UPS. For example, text displayed on such a front-panel LCD may provide information as to whether a primary AC power supply to the unit is within certain acceptable parameters, whether the unit has switched to a backup power supply (e.g., a battery, generator and/or fuel cell), and whether a failure of the backup supply (e.g., a "low battery" condition) is imminent. Other information, such as configuration information, may also be provided via the LCD.

UPSs are often installed in environments, such as server farms or equipment rooms, where an operator's view of such status displays may be obscured by distance from the unit and/or the clutter of other equipment. The characters used in the integrated front-panel LCDs of such devices typically are too small to be read more than a few feet from the LCD. Although front-panel LED's may be used to provide warning or alarm information for a UPS, the LEDs typically used in such devices may be small and may not stand out at a distance. Accordingly, there may be a considerable delay before an operator is aware of a status change of a UPS, such as going on battery or the presence of a low battery condition. Such delay can lead to deleterious results, such as a failure to save critical data or safeguard loads connected to the UPS.

Accordingly, there is a need for techniques for clearly and quickly informing an operator of a change in the operating state of a UPS.

SUMMARY OF THE INVENTION

According to some embodiments of the invention, a UPS includes a UPS circuit that selectively supplies power to a load from first and second power sources, and a display (e.g., an LCD) coupled to the UPS circuit and operative to provide display graphical and/or textual information pertaining thereto. The UPS apparatus further comprises a backlight circuit coupled to the UPS circuit and operative to provide different backlightings of the display, e.g., respective backlighting colors (including different greyscale levels), intensities, patterns, or combinations thereof, responsive to respective states of the UPS circuit. For example, the backlight circuit may provide a first backlighting responsive to the UPS circuit powering the load from a primary power source, a second backlighting responsive to the UPS circuit powering the load from a backup power source, and a third backlighting responsive to the UPS circuit detecting an impending failure of the backup power source.

In further embodiments of the present invention, a UPS includes a housing and a UPS circuit, mounted in the housing, that selectively supplies power to a load from first and second power sources. An externally visible LCD is may be mounted in the housing and is operatively coupled to the UPS circuit and operative to display graphical and/or textual information pertaining thereto. A backlight circuit is operatively coupled to the UPS circuit and operative to provide different backlightings of the LCD responsive to respective states of the UPS circuit.

According to method embodiments of the invention, a method of monitoring a UPS comprises providing different backlightings of a graphical and/or textual display for the UPS responsive to respective states of the UPS. For example, a first backlighting may be provided responsive to the UPS powering a load from a primary power source, and a second backlighting may be provided responsive to the UPS powering the load from a backup power source. A third backlighting may be provided responsive to the UPS detecting an impending failure of the backup power source.

DETAILED DESCRIPTION

Figure 1:
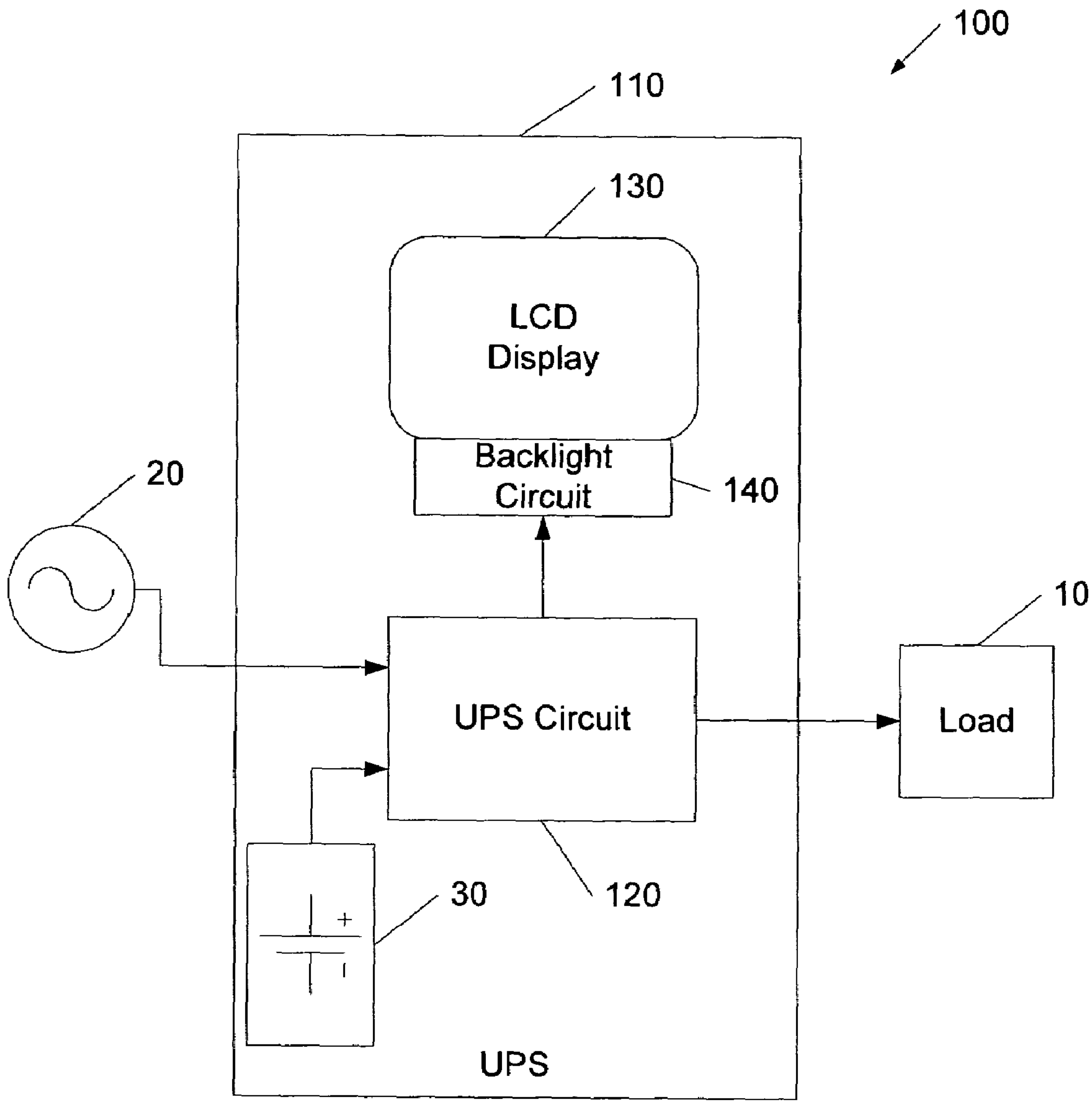
FIG. 1 is a schematic diagram illustrating a UPS with a backlighting control circuit according to some embodiments of the invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. It will be further appreciated that, as used herein, a "UPS" includes uninterruptible power supplies capable of receiving AC and/or DC source voltage and of providing AC and/or DC voltages to loads, including, but not limited to, UPSs adapted for use with computers, industrial equipment and other AC loads and UPSs that serve DC loads, such as telecommunications equipment.

Some embodiments of the invention arise from a realization that a relatively simple and effective technique for monitoring a UPS can be provided by controlling the backlighting of an LCD of the UPS responsive to various operational states of the UPS. Referring to FIG. 1, a UPS 100 according to some embodiments of the invention includes a housing 110 that houses a UPS circuit 120, an externally visible display 130 (preferably an LCD), and a backlight circuit 140. As shown, the UPS circuit 120 is operative to power a load 10 from at least one of a primary power source 20 (e.g., an AC utility line) and a backup power source 30 (here shown as a battery). The display 130 is responsive to the UPS circuit 120 to display graphical and/or textual information pertaining to the UPS circuit 120. The backlight circuit 140 is electrically coupled to the UPS circuit 120, and provides respective backlightings of the display 130 responsive to respective operating states of the UPS circuit 120.

In some embodiments, for example, the backlight circuit 140 may be operative to provide different color backlightings of the display 130 responsive to respective operating states of the UPS circuit 120. For example, a green backlighting may be used to indicate that the UPS circuit 120 is in a "normal" operating state, providing power to the load 10 from the primary power source 20. A yellow or amber backlighting may be used to indicate that the primary power source 20 has failed (e.g., vanished or degraded to a point at which it cannot provide appropriate power quality for the load 10) and/or the UPS circuit 120 is now powering the load 10 from the backup power source 30. A red backlighting may be used to indicate a "warning" or "alarm" state, such as a low backup power capacity (e.g., a low battery condition and/or a low fuel condition in a secondary power source such as a generator or fuel cell).

It will be understood that, although chromatic changes, such as those described above, may provide a particularly effective indication of the state of the UPS 100, other backlighting schemes may be used with the present invention. For example, greyscale backlighting changes may be used to indicate changes in operating states of the UPS 100. Similarly, changes in backlighting intensity or changes in backlighting patterns (e.g., flashing vs. non-flashing), as well as combinations of colors, intensity changes and/or patterns, may be used to provide a similar indicating function within the scope of the invention. It will be further appreciated that different operating states that share certain characteristics may be indicated by the same backlighting. For example, different "failure" or "warning" states may be indicated by the same red and/or flashing backlighting.

It will be understood that the UPS circuit 120 of FIG. 1 may take many forms, including, but not limited to, standby, line interactive, and on-line configurations. The backup power source 20 may take some other form than a battery, such as a fuel cell, generator, flywheel, and/or secondary AC or DC power supply. Although the backup power source 30 is shown in FIG. 1 as integrated in the UPS housing 110, it will be appreciated that the backup power source 30 may be separate from the other components of the UPS 100 (e.g., in a separate battery bank). The display 130 may comprise any of a number of different types of monochrome or color displays, and the backlight circuit 140 may include any of a number of different types of backlight sources, including, but not limited to, cold cathode fluorescent lamps (CCFLs), electroluminescent (EL) backlights, LED arrays, and LED light guides, along with associated circuitry (e.g., drivers, control circuits, and the like) for controlling and/or driving such devices. The UPS circuit 120, the display 130 and the backlight circuit 140 may include common circuitry, such as a microprocessor, microcontroller or other processor device, that implements functions of both the UPS circuit 120, the display 130 and the backlight circuit 140. Although FIG. 1 depicts the display 130 and backlight circuit 140 as being contained within the same housing 110 as the UPS circuit 120, it will be appreciated that the display 130, as well as portions of the backlight circuit 140 may be housed separately from the housing that holds the UPS circuit 120, for example, on a top surface thereof or nearby.

Figure 2:
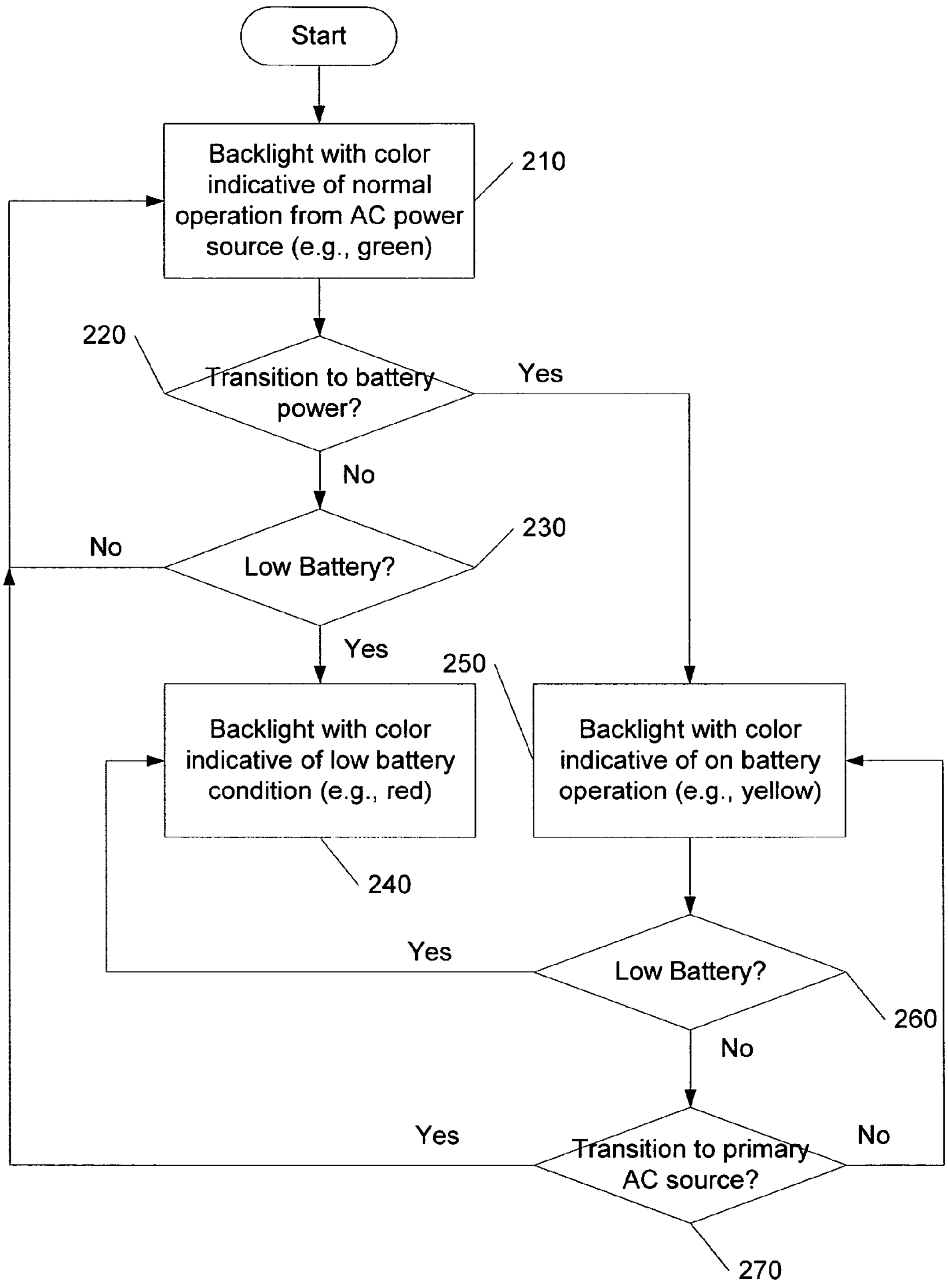
FIG. 2 is a flowchart illustrating exemplary operations for monitoring a UPS according to some embodiments of the invention.

Exemplary operations for the UPS 100 of FIG. 1 according to some embodiments of the invention are illustrated in FIG. 2. The display 130 is backlit with a first color (e.g., green) responsive to the UPS circuit 120 operating in a normal AC powered state (Block 210). If a transition to battery power is detected (Block 220), the display 130 is backlit with a color indicative of an "on battery" condition (e.g., a color indicative of a cautionary state, such as yellow or amber) (Block 250). If a "low battery" condition (Block 230) is detected, the display 130 is backlit with a color indicative of the low battery condition (e.g., a color indicative of impending failure of battery power or a "warning" state, such as red) (Block 240). If the UPS circuit 120 is in the "on battery" state and detects a low battery condition (Block 260), the backlighting is changed to the "low battery" color (Block 240). If the primary AC power source returns (Block 270), the backlighting color transitions back to the "normal" color (Block 210).

It will be appreciated that the operations illustrated in FIG. 2 are provided for exemplary purposes, and that respective backlighting colors and/or other backlighting schemes may be provided to indicate these and other states, such as a bypassed state in which the AC source 20 is directly coupled to the load 10, an offline mode in which the UPS circuit 120 does not power the load 10, or the like. It will be further understood that transitions between states may occur in a manner other than that illustrated in FIG. 2. In addition, for any of the backlighting states described above (or others not specifically discussed with reference to the exemplary implementation of FIG. 2), corresponding graphical and/or textual information may be displayed on the display 130, such as text detailing the particular cautionary or warning condition.

It will be understood that operations depicted in the diagrams of FIGS. 1 and 2, and combinations thereof, may be implemented using one or more electronic circuits, for example, in a microprocessor used to control a UPS. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations. Accordingly, blocks of the diagrams of FIGS. 1 and 2 support electronic circuits and other apparatus that perform the specified operations, and acts for performing the specified operations.

In the drawings and specification, there have been disclosed exemplary embodiments of the invention. Although specific terms are employed, they are used in a generic and descriptive sense only and not for purposes of limitation, the scope of the invention being defined by the following claims.

The invention claimed is:

1. An uninterruptible power supply (UPS), comprising:

a housing;

a UPS circuit, mounted in the housing, operative to selectively supply power to a load external to the housing from first and second power sources;

an externally-visible LCD associated with the housing, operatively coupled to the UPS circuit and operative to display graphical and!or textual information pertaining thereto; and a backlight circuit operatively coupled to the UPS circuit and operative to provide different backlightings of the LCD to indicate respective states of the UPS circuit, wherein the backlight circuit is operative to backlight the LCD with a first color to indicate the UPS circuit powering the load from a primary power source and to backlight the LCD with a second color to indicate the UPS circuit powering the load from a backup power source.

2. A UPS according to claim 1, wherein the backlight circuit is further operative to backlight the LCD with a third color to indicate the UPS circuit detecting an impending failure of the backup power source.

3. An uninterruptible power supply (UPS), comprising:

a housing;

a UPS circuit, mounted in the housing, operative to selectively supply power to a load external to the housing from first and second power sources;

an externally-visible LCD associated with the housing, operatively coupled to the UPS circuit and operative to display graphical and/or textual information pertaining thereto; and a backlight circuit operatively coupled to the UPS circuit and operative to provide different backlightings of the LCD to indicate respective states of the UPS circuit, wherein the backlight circuit is operative to backlight the LCD with a first color to indicate a normal operating state of the UPS circuit, to backlight the LCD with a second color to indicate a cautionary state of the UPS circuit, and to backlight the LCD with a third color to indicate an alarm state of the UPS circuit.

* * * * *